United States Patent [19]

Gutridge et al.

[11] 4,015,542
[45] Apr. 5, 1977

[54] CONVERTIBLE HEADREST FOR SLEEPING CARS

[75] Inventors: Jack E. Gutridge, Dyer, Ind.; Patricia A. Raidt, Calumet City, Ill.

[73] Assignee: Pullman Incorporated, Chicago, Ill.

[22] Filed: Feb. 17, 1976

[21] Appl. No.: 658,196

[52] U.S. Cl. .................................. 105/322; 5/339; 105/345; 297/220; 297/395

[51] Int. Cl.² .......................................... B60N 3/00

[58] Field of Search .......... 297/118, 290, 291, 295, 297/396, 391, 219, 220, 395; 5/337, 339, 325; 105/329 R, 345, 322, 336

[56] References Cited

UNITED STATES PATENTS

| 10,547 | 2/1854 | Holbrook | 297/395 X |
|---|---|---|---|
| 378,948 | 3/1888 | Bissell | 297/118 |
| 2,183,418 | 12/1939 | Williams | 5/339 |
| 2,882,835 | 4/1959 | Buchanan | 105/314 |
| 3,095,239 | 6/1963 | Hendrickson | 297/396 |
| 3,437,374 | 4/1969 | Bennett | 297/391 |
| 3,578,383 | 5/1971 | Earl | 297/391 |

FOREIGN PATENTS OR APPLICATIONS 794,635 5/1958 United Kingdom ............... 297/391

Primary Examiner—Paul R. Gilliam
Assistant Examiner—Kenneth J. Dorner
Attorney, Agent, or Firm—Richard J. Myers

[57] ABSTRACT

A sleeping car compartment which includes a convertible seat arrangement also usable as a bed includes a headrest positioned on a wall of the sleeping compartment above the back of the seat. The headrest includes a shaped pillow which is releasably held in the headrest position and may be removed therefrom for use on the bed when the seat arrangement is converted.

1 Claim, 4 Drawing Figures

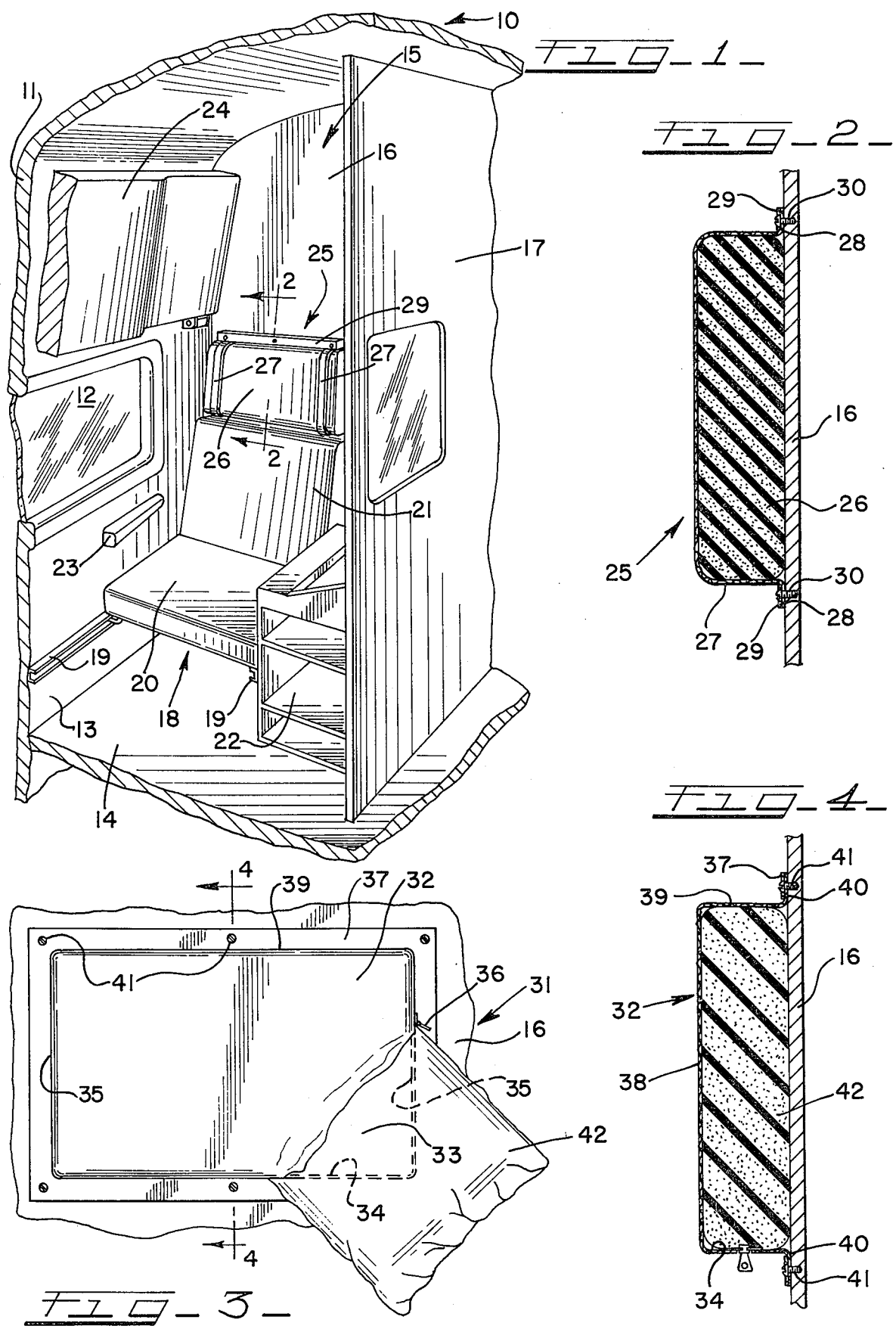

1

CONVERTIBLE HEADREST FOR SLEEPING CARS

BACKGROUND OF THE INVENTION

1. Field of the Invention

The present invention relates to the field of sleeping car compartments wherein the seats are readily convertible from a seating to a sleeping arrangement. More specifically the invention relates to a headrest which is also convertible to a pillow when the arrangement is adjusted for sleeping position.

2. Description of the Prior Art

The prior art is exemplified in the following patents; U.S. Pat. Nos. 378,948, Mar. 6, 1888, 391,748, Oct. 23, 1888, 2,691,175, Oct. 12, 1954, 3,437,374, Apr. 8, 1969 and 3,568,890, Mar. 9, 1971. The present invention is an improvement over the aforementioned patents.

SUMMARY OF THE INVENTION

A railway sleeping car comprises a compartment including a convertible seating arrangement which may be converted to a sleeping position. A headrest is positioned within the compartment above the seat backs each including a shaped pillow of flexible rubberlike material which is held in position by resilient straps and is readily removable from the headrest position when it is desired to use the same as a pillow during the sleeping conversion. A modified invention includes a headrest also readily convertible to sleeping position wherein a cover or flexible bag is supported on the wall above the seat back and is provided with an opening through which a conventional pillow may be inserted for headrest use and which may be readily removed for use with the sleeping arrangement when desired. The cover is provided with a slide fastener for opening and closing the opening in the cover which is provided at one lower corner thereof so that the pillow may be readily inserted and removed as desired.

BRIEF DESCRIPTION OF THE DRAWINGS

FIG. 1 is a perspective view showing the interior of a portion of a sleeping car compartment;

FIG. 2 is a cross-sectional view taken substantially along the line 2—2 of FIG. 1;

FIG. 3 is a detailed side-elevational view of a modified convertible headrest arrangement; and FIG. 4 is a cross-sectional view taken along the line 4—4 of FIG. 3.

DESCRIPTION OF THE PREFERRED EMBODIMENT

Referring particularly to FIG. 1, a sleeping car 10 comprises a car side wall 11 having a window 12 and an interior wall surface 13. The car comprises a floor 14 and a seat and sleeping compartment 15 is provided within the car 10. The sleeping car at opposite ends thereof is provided with inner transverse vertical walls 16 and a longitudinally inner partition wall 17 connected thereto.

A convertible seat and bed arrangement generally designated at 18 is provided within the compartment 15. FIG. 1 discloses one of the seating arrangements at one end of the compartment. The other end contains a similar seating arrangement (not shown) with both arrangements being convertible to sleeping berth position. In FIG. 1, a track 19 is supported on the interior wall 13 and has connected thereto a convertible seat 20 which is also suitably connected to another track 19 provided on a storage rack and table arrangement designated at 22. The seat 20 is also provided with a seat back 21 shown in a vertical position the same being convertible with the seat 20 into a horizontal bed arrangement. An arm rest 23 is provided on the wall 13 above the seat 20. The compartment also includes an upper hinged bed 24, conventional in the prior art, and adapted to be moved from the position shown into a sleeping bed arrangement.

Referring now to FIGS. 1 and 2, a convertible pillow and headrest arrangement 25 includes a shaped pillow 26. The pillow 26 is preferably of a type which will continue to maintain its shape and may be made from a material such as sponge rubber or similar materials which are flexible and yet maintain their shaped condition. As best shown in FIG. 2, the shaped pillow 26 is removably held in position by a pair of vertically extending horizontally spaced straps 27 which have connecting end portions 28 connected by means of horizontal attaching strips 29 to the wall 16 by means of screws 30. The flexible straps 27 may be of a resilient material which biases the pillow 26 in the headrest arrangement as indicated. In order to remove the pillow for sleeping use when the seat 20 and backrest 21 are placed in a horisontal bed position it is a simple matter for the passenger to disengage the pillow 26 from the retaining position of the straps 27. Thus, an effective and quickly convertible arrangement is disclosed with minimal parts and with a highly comfortable arrangement for the passenger both in the headrest position and the sleeping position.

Referring now to FIGS. 3 and 4, a modified embodiment of the invention is disclosed the same including a convertible pillow and head arrangement generally designated at 31. The arrangement 31 includes a bag or cover of flexible material 32 having at one corner an opening 33 partially provided in a bottom wall or lower edge portion 34 and partially provided in a vertical wall or vertical edge portion 35 of the bag or cover 32. The bag also includes a second vertical wall 35 and a top wall or top edge portion 39. The opening 33 is provided with a sliding fastener 36 of a conventional type which may be easily opened and closed. The bag also includes a front wall 38. A rectangular attaching flange 37 as best shown in FIG. 4, is provided to be secured by a rectangular flange member 40 coextensive with the walls 34, 35 and 39 which securely connects the bag to the vertical wall 16 of the compartment by means of screws 41. A pillow of a conventional type 42 is readily inserted through the opening 33 into the bag or cover 32 as desired and thus may be easily and quickly removed and returned to its position after use by the passenger. Thus, the arrangement also provides an expeditious simple headrest arrangement which is quickly and readily converted for sleeping purposes by the passenger.

The foregoing description and drawings merely explain and illustrate the invention and the invention is not limited thereto, except insofar as the appendant claims are so limited, as those skilled in the art who have the disclosure before them will be able to make modifications and variations therein without departing from the scope of the invention.

What is claimed is:

1. In a railway car compartment comprising first, second and third angularly joined upright side walls, a seat within the compartment having a backrest positioned against said second side wall and at one side adjacent to said first side wall, said backrest terminating in a generally horizontal straight upper edge,
- a combination pillow and headrest mounted on said second side wall immediately above said backrest upper edge comprising:
- a flexible rectangular shaped cover having a front wall and a lower edge portion immediately above said backrest and paralleling the same and having first and second vertical end edge portions and a top edge portion defining corners,
- said first vertical end edge portion being located contiguous to said first side wall,
- flange means on said cover and extending outwardly from each of said portions for mounting said cover to said second side wall,
- means providing an access opening into the cover remote from said first side wall and extending from intermediate the ends of said lower edge portion to said second vertical edge portions around the corner defined thereby and terminating intermediate the ends of said second vertical edge portion,
- a pillow conforming to the shape and dimensions of the cover insertable into the cover through said corner opening beneath said front wall and withdrawable with respect to said cover through said opening,
- the disposition of said opening in said corner maximizing accessability into the cover for removing and inserting the pillow horizontally from said first vertical edge portion to the second vertical edge portion and from said lower edge portion to the upper edge portion, and
- closure means for said opening on said lower edge and second vertical edge portions.

* * * * *